(No Model.)  C. M. CONRADSON.  10 Sheets—Sheet 2.
LATHE.

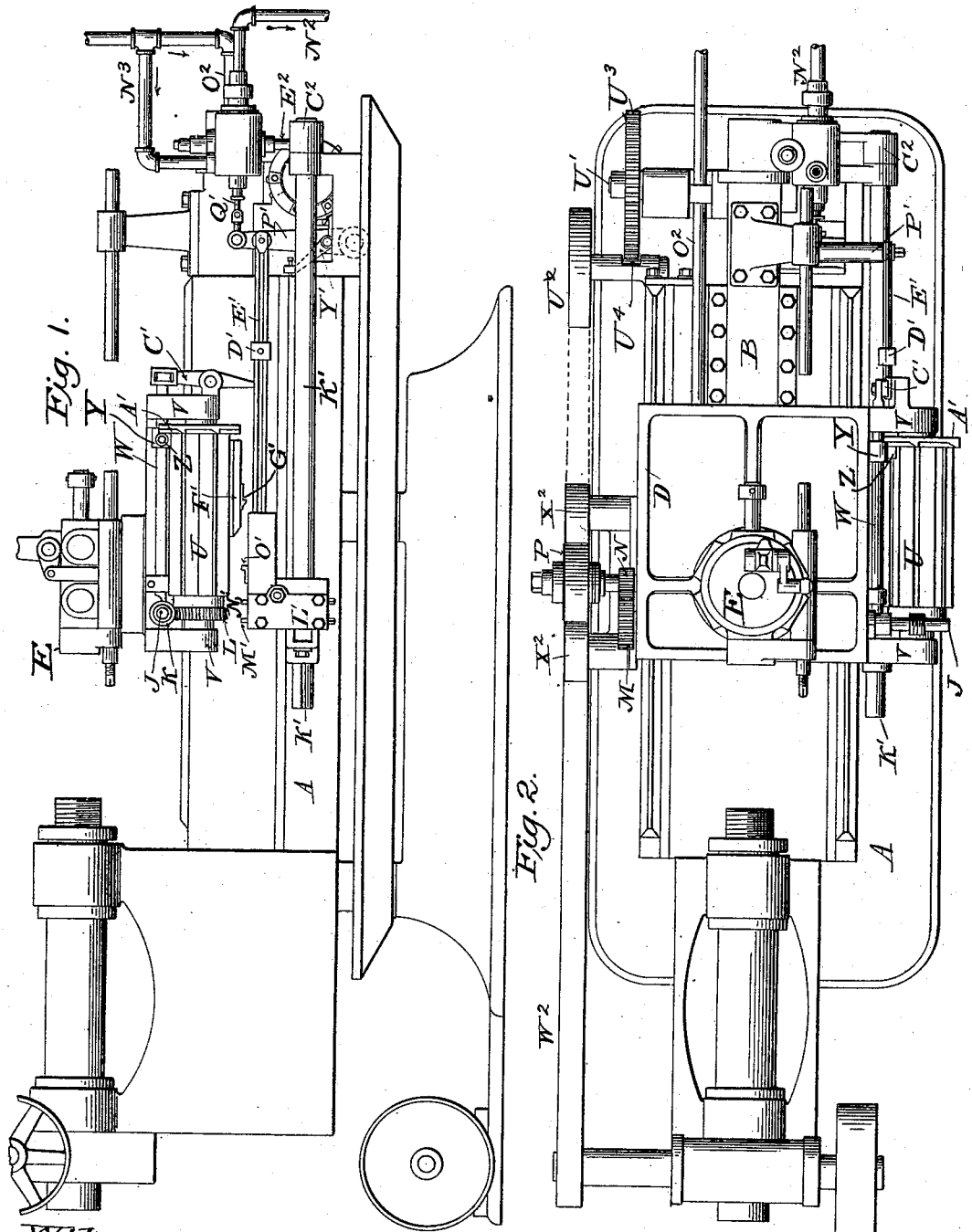

No. 490,864.  Patented Jan. 31, 1893.

Witnesses
James F. Duhamel
Horace A. Dodge

CONRAD M. CONRADSON,
Inventor,
by Dodge & Sons,
Atty.

(No Model.) 10 Sheets—Sheet 3.
C. M. CONRADSON.
LATHE.
No. 490,864. Patented Jan. 31, 1893.

Witnesses
James F. Duhamel
Horace A. Dodge.

CONRAD M. CONRADSON,
Inventor,
by Dodge & Sons,
Attys.

(No Model.) 10 Sheets—Sheet 6.

C. M. CONRADSON.
LATHE.

No. 490,864. Patented Jan. 31, 1893.

Witnesses:
James F. Duhamel
Horace A. Dodge.

CONRAD M. CONRADSON,
Inventor
by Dodge & Sons,
Attys.

THE NORRIS PETERS CO., PHOTO-LITHO., WASHINGTON, D. C.

(No Model.) 10 Sheets—Sheet 7.
C. M. CONRADSON.
LATHE.
No. 490,864. Patented Jan. 31, 1893.
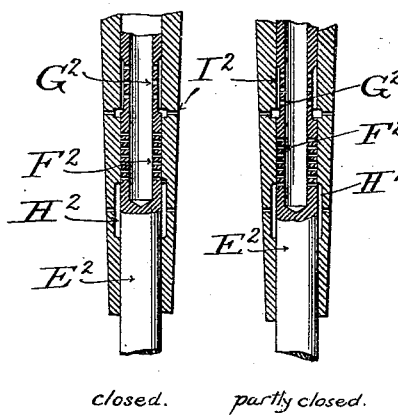
Fig. 10. closed.
Fig. 11. partly closed.
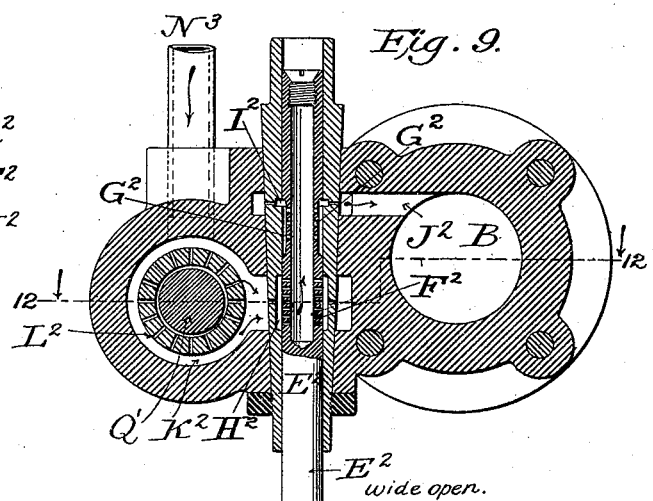
Fig. 9. wide open.
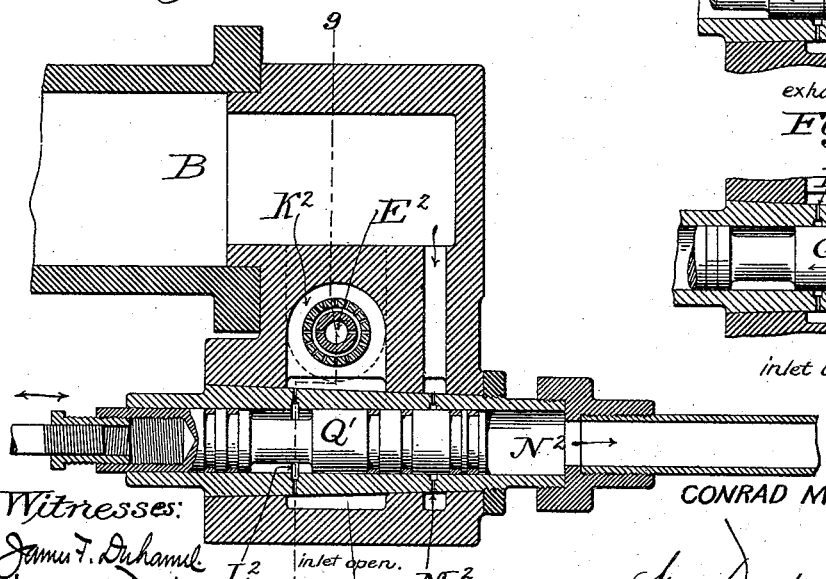
Fig. 12.
Fig. 13. exhaust open.
Fig. 14. inlet and exhaust closed.
inlet open.
Witnesses:
James T. Duhamel
Horace A. Dodge
CONRAD M. CONRADSON, Inventor,
by Dodge & Sons
Attys.

(No Model.) 10 Sheets—Sheet 8.
C. M. CONRADSON.
LATHE.
No. 490,864. Patented Jan. 31, 1893.
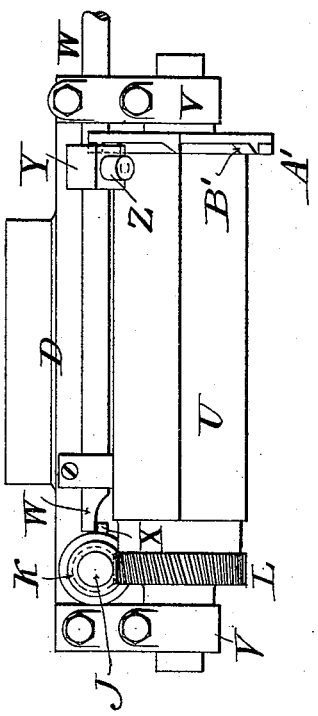
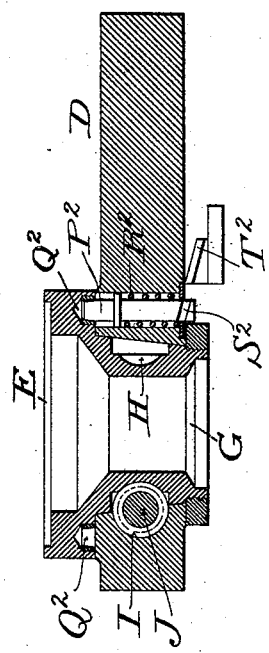
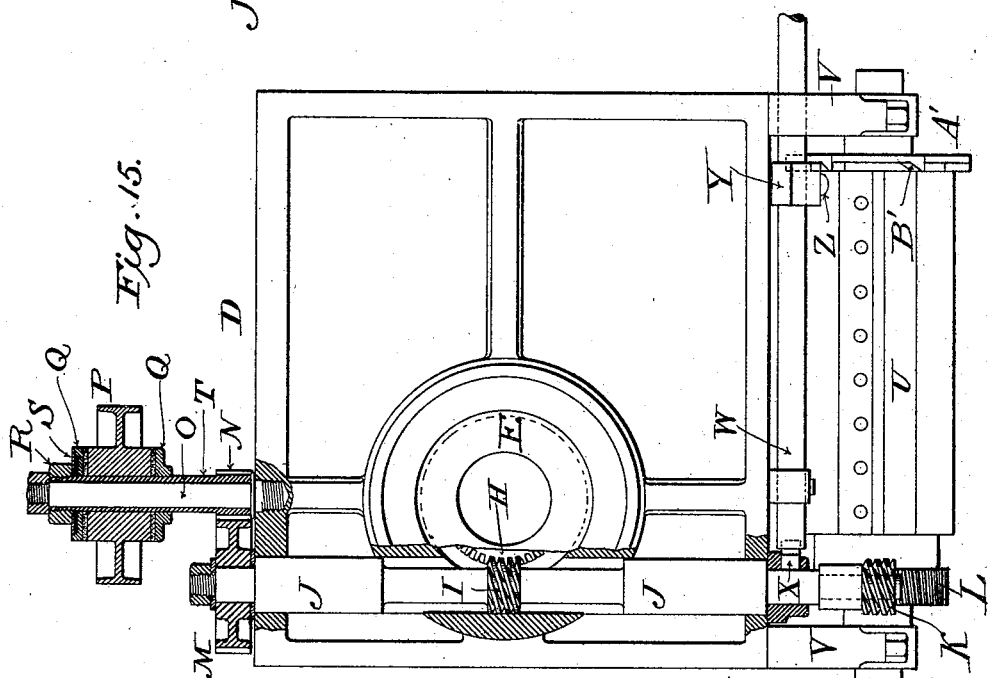
Witnesses:
James F. Duhamel
Horace A. Dodge
CONRAD M. CONRADSON,
Inventor,
by Dodge & Sons, Attys.

(No Model.) 10 Sheets—Sheet 9.
C. M. CONRADSON.
LATHE.
No. 490,864. Patented Jan. 31, 1893.
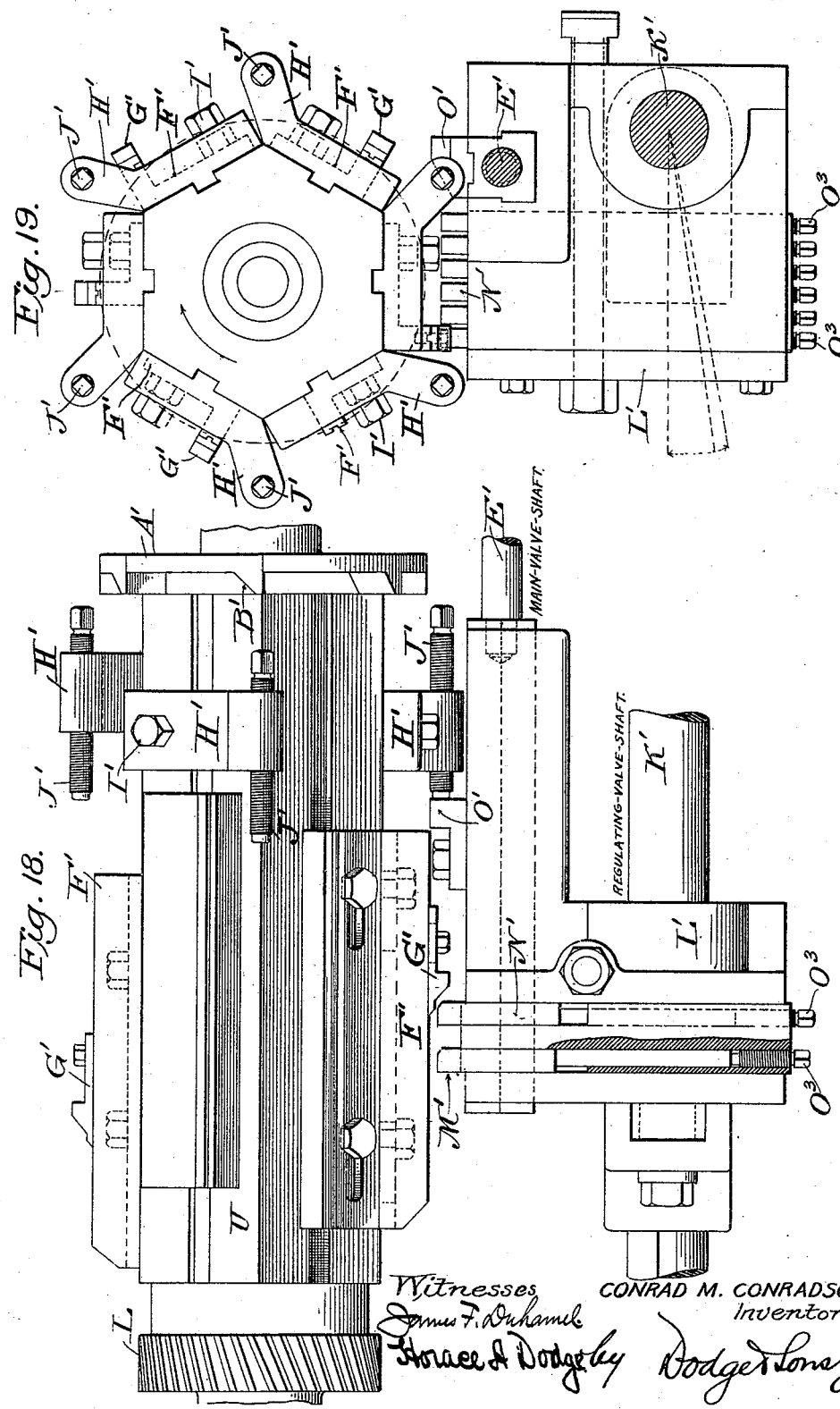

(No Model.)

C. M. CONRADSON.
LATHE.

No. 490,864. Patented Jan. 31, 1893.

10 Sheets—Sheet 10.

Witnesses:
James F. Duhamel
Horace A. Dodge.

CONRAD M. CONRADSON,
Inventor,
by Dodge & Sons,
Attys.

UNITED STATES PATENT OFFICE.

CONRAD M. CONRADSON, OF MADISON, WISCONSIN.

LATHE.

SPECIFICATION forming part of Letters Patent No. 490,864, dated January 31, 1893.

Application filed March 24, 1892. Serial No. 426,250. (No model.)

*To all whom it may concern:*

Be it known that I, CONRAD M. CONRADSON, a citizen of the United States, residing at Madison, in the county of Dane and State of Wisconsin, have invented certain new and useful Improvements in Lathes, of which the following is a specification.

My invention relates to lathes or machines designed more particularly for the manufacture of screws and similar articles, although the invention is applicable to other classes and styles of machines.

The object of the present invention is to provide a machine most of the movements of which may be controlled by any suitable fluid, such as air, gas, steam, water, &c.

Figure 3:
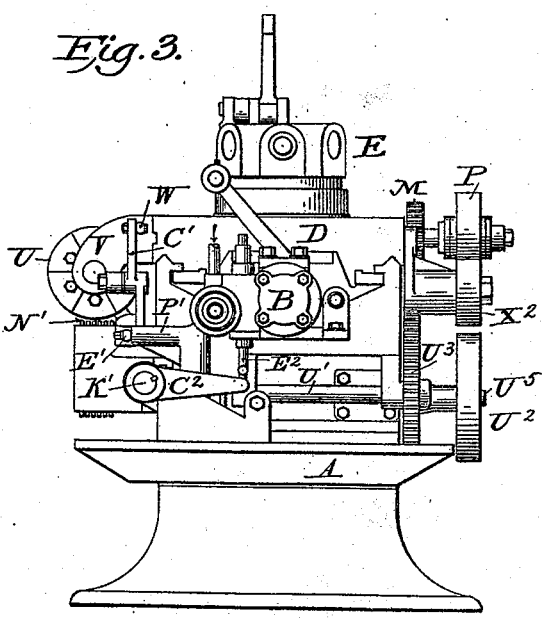
Figure 4:
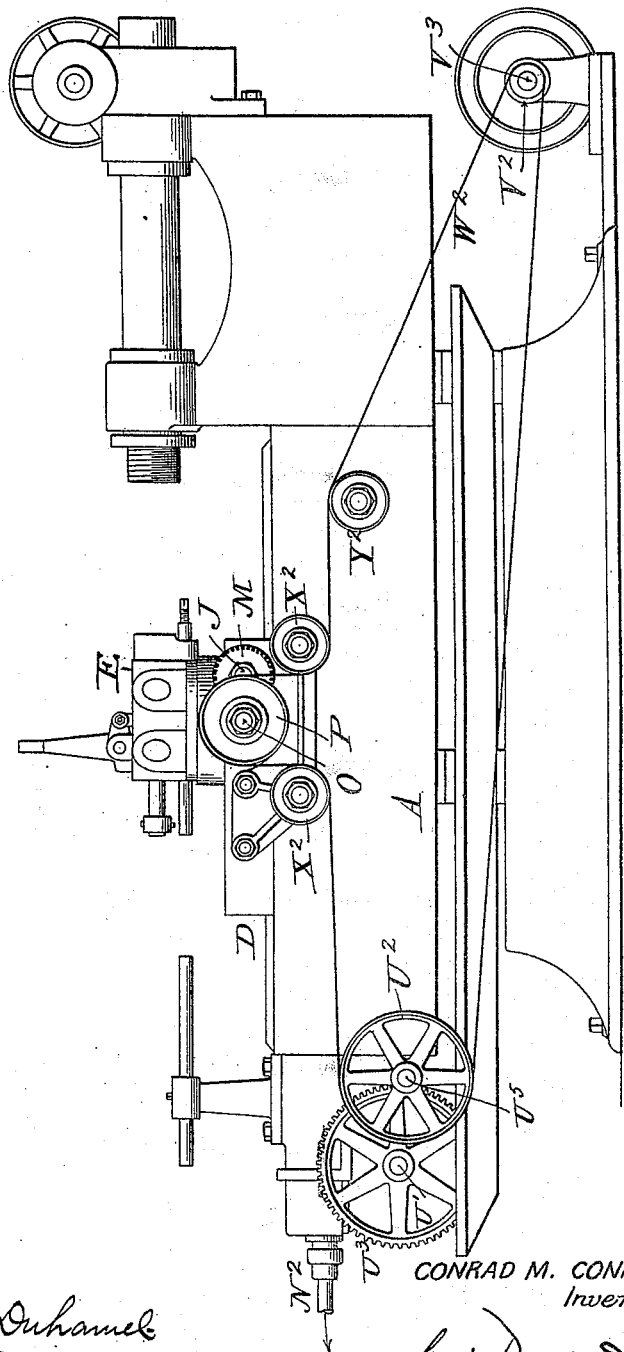
Figure 5:
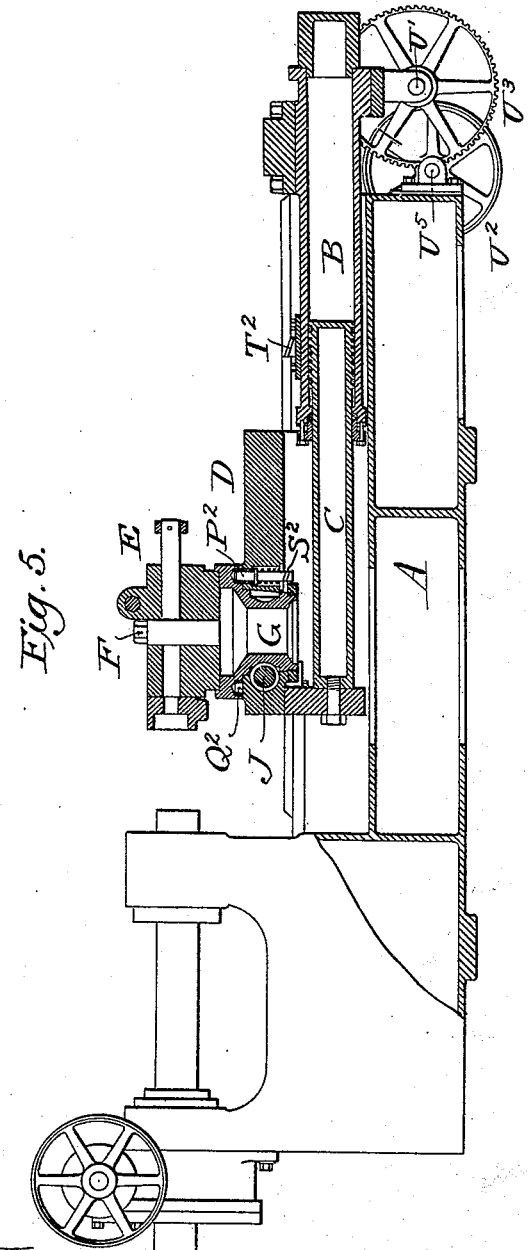
Figure 6:
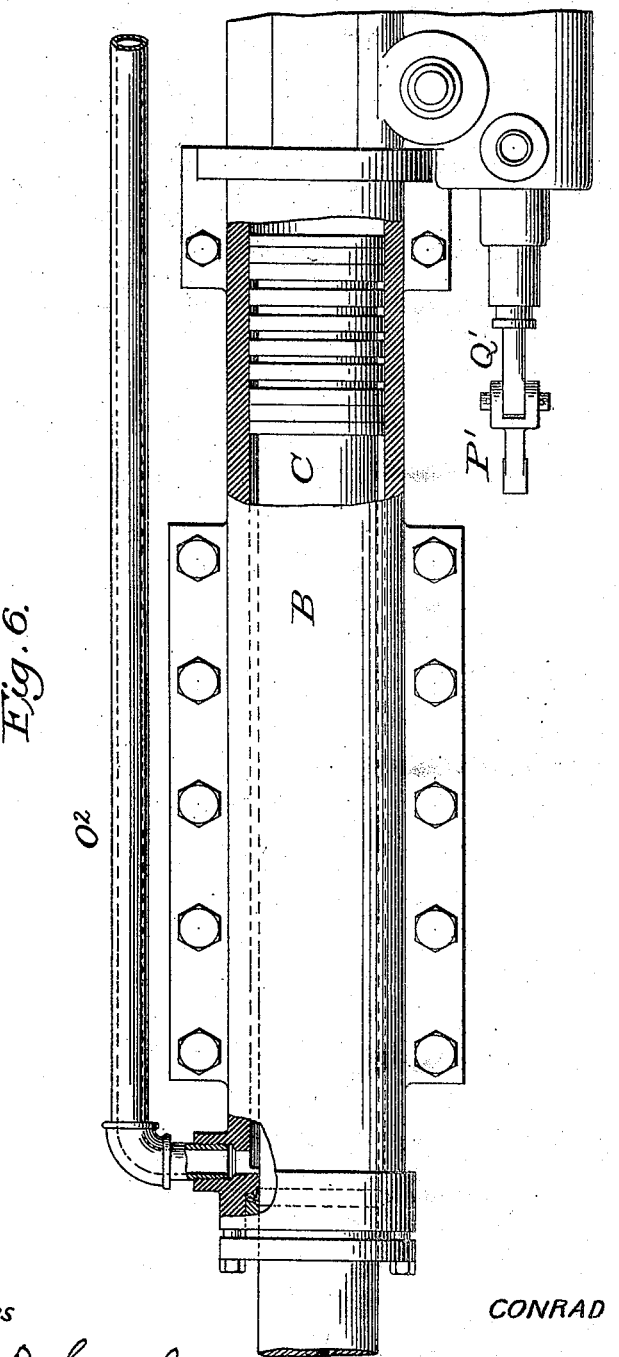
Figure 7:
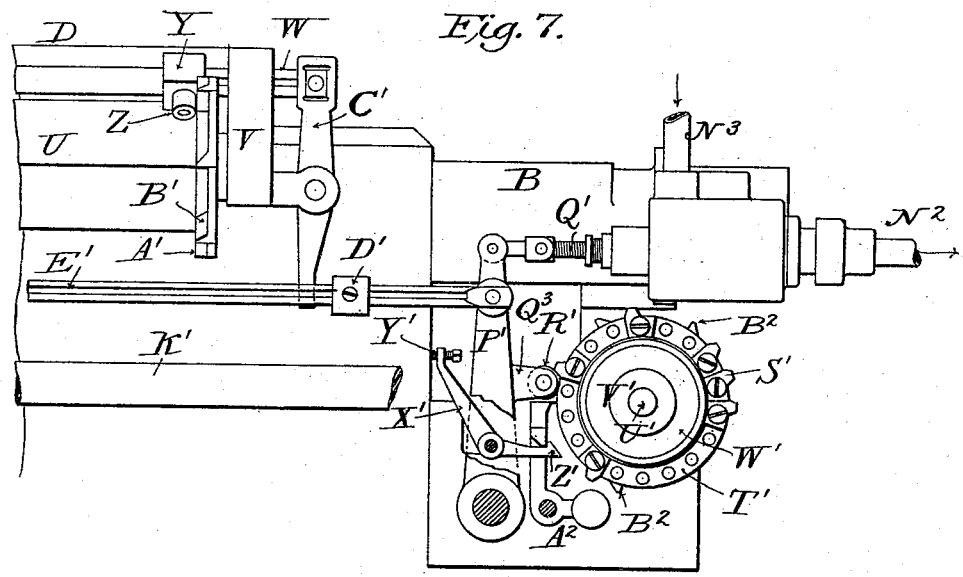
Figure 8:
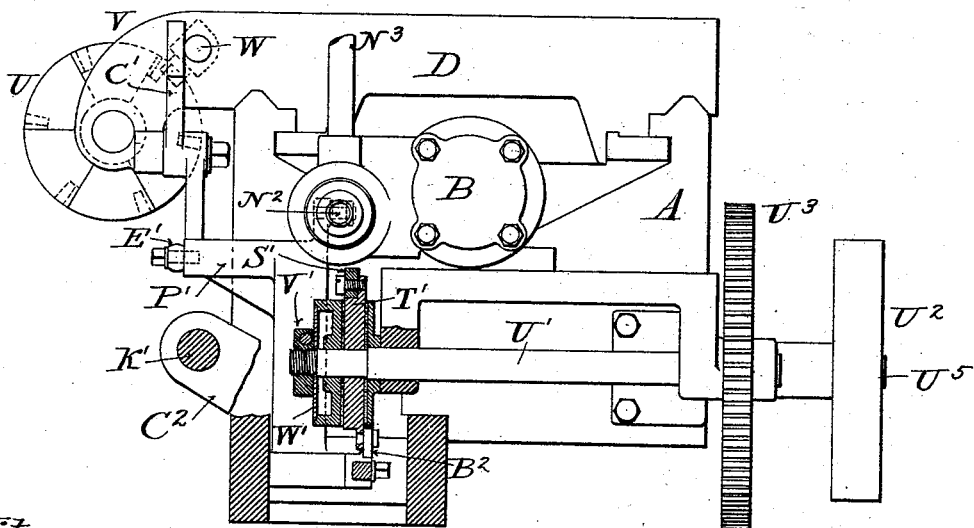
Figure 20:
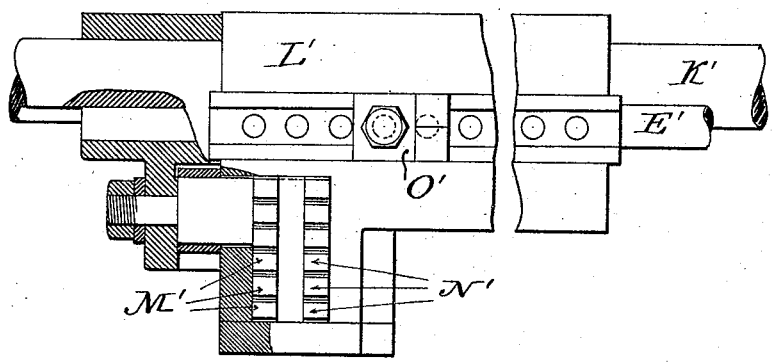

In the accompanying drawings,—Figure 1 is a side elevation of a portion of a screw-cutting lathe showing my improvements applied thereto; Fig. 2, a top plan view of the same; Fig. 3, an end view; Fig. 4, a back side view; Fig. 5, a vertical longitudinal central sectional view through the turret and its actuating mechanism; Fig. 6, a top plan view partly in section of the cylinder and piston and attendant parts designed for actuating the turret slide; Figs. 7 and 8, respectively, face and end views partly in section, showing the general arrangement of the valve mechanism and the stop bar; Fig. 9, a vertical transverse sectional view through the cylinder and main valve for the same; Figs. 10 and 11, longitudinal sectional views through the regulating valve showing the latter in different positions; Fig. 12, a horizontal sectional view through the rear end of the cylininder and valve chamber; Figs. 13 and 14, longitudinal sectional views showing the main valve in different positions; Fig. 15, a top plan view partly in section of the portion of the turret slide and attendant mechanism; Fig. 16, a front face view of the same; Fig. 17, a longitudinal vertical sectional view through the turret; Fig. 18, an enlarged side or face view of the stop bar and the rocking block which said stop bar is designed to actuate, Fig. 19, an end view of the same; Fig. 20, a top plan view partly in section of the rocking block adapted to be actuated by the stop bar; and Fig. 21, a face view of the same partly in section.

A indicates the main frame or body of the machine upon which is mounted an elongated cylinder B extending lengthwise of the machine, as clearly shown in Figs. 5 and 6. Mounted within this cylinder is a piston C, which, as shown in Fig. 5, is preferably made in the form of a cylinder closed at both ends, and connected directly or indirectly to the turret slide D, which carries the rotatable turret E. The turret E is adapted to turn or rotate about a vertical axis F and is provided near its base with a neck G which is toothed circumferentially as at H, Figs. 5, 15 and 17. This tubular neck and the teeth H cut therein are designed to form and act as a worm-wheel, and to be engaged by a worm I secured upon a shaft J extending transversely across the turret slide as shown in Fig. 15. At its forward end the shaft J carries a similar worm K which engages a worm-wheel L of the same size as the worm-wheel H of the turret E as shown in Figs. 15 and 16; while at the rear end the shaft J is provided with a gear M, which engages a smaller gear N secured upon a sleeve T encircling a stud or shaft O projecting rearwardly from the turret slide D.

Mounted upon the sleeve T is a band wheel P which is clamped between two collars Q Q by means of a nut R and a spring disk or washer S, as clearly shown in Fig. 15. Ordinarily the rotation of the band wheel P will effect the rotation of the collar or sleeve T; but should the parts meet with any unusual obstruction the band wheel will overcome the force of the spring washer S and turn or rotate upon the sleeve or collar T without imparting motion to the gearing M, N, &c. The worm-wheel L to which I have already referred is secured at the forward end of a stop bar U, Figs. 1, 2, 3, 15 and 16, which is journaled in arms or brackets V projecting from the front side of the turret slide D, the construction and arrangement being such that at each rotation of the turret, the stop bar will be turned or rotated a corresponding distance.

Mounted on the front side of the turret-slide parallel with the axis of the stop-bar U is a longitudinally sliding-rod W whose forward end is adapted to engage an arm or finger X secured to the shaft J as clearly shown in Figs. 15 and 16, and thereby prevent the rotation of this shaft J at certain predetermined intervals. The gearing H, I and K, L is so proportioned that at each rotation of the shaft J the turret and the stop-bar will each be turned or rotated through an arc of sixty degrees, and at the end of this movement further rotation of the shaft, the turret, and the stop-bar, is prevented by reason of the rod W engaging the stop or pin X secured to the said shaft J.

The rod W is provided with a block Y carrying a stud or roller Z, as clearly shown in Figs. 1, 2, 7, 15 and 16, which latter is designed to be actuated by means of a cam-plate A' secured to the rear end of the stop-bar U, as shown in said figures. It will be noticed upon reference to Figs. 15 and 16 that this cam-plate A' is provided with a series of beveled faces or cams B' corresponding in number to the faces of the stop-bar and of the turret, so that when the turret is rotated to bring a new tool into position, the corresponding face or cam B' of the cam-plate A', will be brought to bear upon the stud Z and actuate the rod W. The rod W extends rearwardly a short distance, where it is connected to the upper end of a vertical lever C' pivoted to the turret-slide, as clearly shown in Fig. 7; the lower end of said lever C' projecting downwardly in such position to be struck at certain intervals by a stop-block D' adjustably secured upon a rod E' which serves as hereinafter set forth to actuate the main valve of the fluid pressure apparatus.

The stop-bar U is provided on its respective faces with a series of cams or blocks F' which are adapted to be set at any desired position lengthwise of the said bar, as clearly shown in Figs. 18 and 19, said cams F' being slotted as also shown in said figures, to permit the application to their outer faces of supplemental cams G' for the purpose about to be explained.

In rear of the cams F', G' I secure to the faces of the stop bar a series of stops H' which are rendered adjustable lengthwise upon the stop bar by means of bolts I', and which are rendered adjustable in themselves by having their striking points formed of screws or bolts J'. From this construction it will be seen that I am able to secure a wide range of adjustment for the several stops or cams of the different faces of the stop bar.

Figure 21:
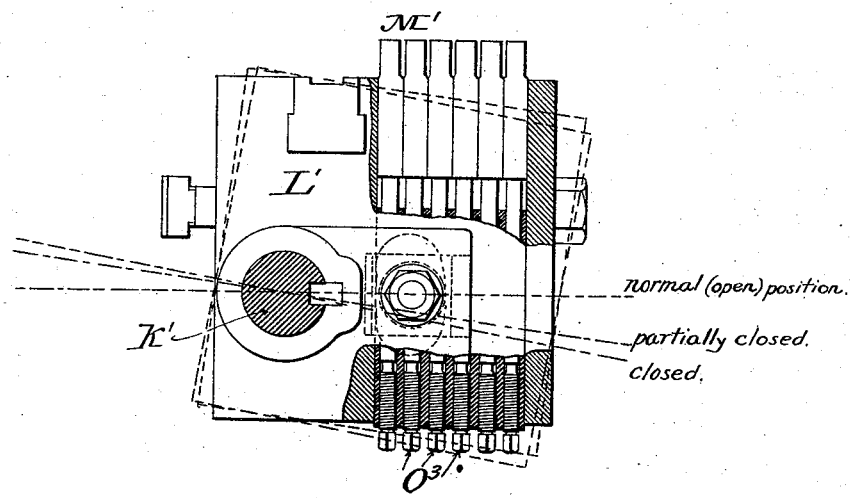

Extending lengthwise of the machine parallel with the axis of the stop-bar is a rock-shaft K' upon which is secured a block L' which carries two sets or series of pins M' and N'. The number of these pins M' and N' corresponds to the number of faces of the stop-bar and of the turret, and they are arranged in two rows extending in a direction transverse to the axis of the stop-bar, as shown in Figs. 18 and 19. Each pin M' and N' is rendered independently adjustable as to height by means of the screws $O^3$ as shown in Figs. 18, 19 and 21. This block L' is arranged directly under the stop-bar U as shown in Fig. 19, so that the cams F' and G' may act upon the side pins M' and N' as the said stop-bar is fed along. As the stop-bar moves lengthwise toward the block L' the beveled nose of the large cam F' will strike one of the pins M' or N' and depress the block L'. That is, it will tip or rock said block and the shaft K' to which it is secured, as indicated by the dotted lines in Figs. 19 and 21. As the stop-bar continues to travel forwardly the secondary stops G' secured to the stop-bar will strike the pins N' and further depress or rock or tip the block and cause a further rotation of the shaft K'.

It will be noticed upon reference to Figs. 20 and 21 that the block L' is adapted to slide lengthwise a limited distance relatively to the rock shaft K', so that as the stop-bar U continues the movement before alluded to, the stops or cams H' will, when they strike an abutment O' secured to the upper face of the block L' move said block lengthwise a limited distance and carry with it the main valve shaft E'. Of course the cams F', G' and H' are adapted to be mounted upon the stop-bar at various points throughout the length of the latter, and hence it will be seen that the regulating-valve-shaft K' will be rocked or tipped earlier or later in the travel of the stop-bar and the turret slide to which said bar is connected, according to the length of travel it is desired to give the turret slide when operating with a particular tool. It is also apparent that the main valve shaft E' will be actuated at a point sooner or later in the travel of the turret-slide according to the position of the cams or stops H' upon the rotary stop-bar, their position being dependent also upon the character of the tool in the corresponding face of the turret. The sliding motion given to the rod E' by the engagement of the stops H' and O' effects not only a change in the position of the main valve, but also effects a sudden rocking or tipping of the lever C', and a longitudinal movement of the rod W which carries the stud Z engaging the cam-plate A' on the rotatable stop-bar.

The longitudinally reciprocating bar E' is connected at its rear end with an upright lever P', which latter is connected at its upper end with the main regulating valve Q' as shown in Figs. 1 and 7. Lever P' is provided on its rear face with an arm $Q^3$ carrying a roller R', which latter is designed to engage or be acted upon by one or more stops or teeth S' secured to a disk T' frictionally held in engagement with a shaft U', as shown in Fig. 8, by means of a nut V' and a spring washer W'. These teeth or projections S' are removable and may be applied at various points throughout the periphery of the wheel or disk T' so that they shall come into engagement with the lever P' or its arm or roller at predetermined times.

Pivoted to the lever P' is a small elbow lever X', one end of which carries a set screw Y' designed to come into engagement with a portion of the frame-work, while the other end is formed into a hook, Z', which is adapted to engage the cross-bar of the weighted bell crank lever A², as clearly shown in Fig. 7. The upper end of this elbow lever A² is designed to come into engagement with a series of adjustable stops or teeth B² also secured to the disk or wheel T', as shown in Figs. 7 and 8. When the arm Q³ of the lever P' is bearing upon the smooth face or periphery of the wheel or disk T', the elbow lever X' has its hook end Z' in engagement with the elbow lever A²; but as the wheel or disk T' rotates one of its teeth S' coming in contact with the roller or arm of the lever P' moves said lever backward away from the disk, and as it thus moves it causes the lever X' to be rocked upon its pivot and its hook-end to be thrown out of engagement with the lever A². As soon as thus released the lever A² rocks upon its pivot and its upper end is thrown into engagement with one of the teeth B² of the rotatable wheel or disk, and prevents further rotation of the latter. The rock-shaft K' carries at its rear end a radial arm C², which is connected by means of a link D² with the regulating valve E², as shown in Fig. 9, so that as the shaft K' is rocked or oscillated by the action of the rotatable stop-bar upon the block L', the said valve E² will be brought to one of the three positions illustrated in Figs. 9, 10 and 11. The reciprocating rod E' which is connected to the main valve Q' is adapted to bring the said valve to either of the three positions shown in Figs. 12, 13 and 14.

It will be noticed upon reference to Figs. 9 and 12 that the regulating valve E² is arranged vertically between the rear end of the main cylinder and the main valve and comprises merely a hollow spindle having a series of lateral orifices F² and G² which are designed to be brought into communication respectively with the passages H² and I². The passage I² at the upper end of the valve communicates with the cylinder through the lateral passage J², (Fig. 9) while the chamber or passage H² communicates with the main valve chamber K², as clearly shown in Figs. 9 and 12. When the regulating valve is closed, the openings F² are brought out of alignment with the chamber or passage H², and hence no fluid can pass from the main valve chamber into the hollow stem of the regulating valve. When, however, the valve is lowered as in Fig. 11, only a small number of the openings F² are brought into communication with the passage H², and hence only a small quantity of the fluid can pass through the regulating valve into the cylinder.

In Fig. 9 the regulating valve is shown wide open with all of the openings F² brought into the space or chamber H², and hence the full force of all the fluid employed may be utilized in the cylinder. The main valve box or shell is provided with two series of perforations or holes L² and M², the former of which communicates with the space or chamber K², while the other, M², communicates with the outlet pipe N² as clearly shown in Figs. 12, 13 and 14.

In Fig. 12 the main valve is shown with the inlet port L² wide open and the outlet port M² closed.

In Fig. 13, the inlet ports L² are shown closed, while the outlet or exhaust port M² is open.

In Fig. 14 both the inlet and outlet ports are closed by the valve.

Upon reference to Fig. 6 it will be noticed that there is a pipe O² communicating with the forward end of the cylinder, so that under all circumstances the forward movement of the cylinder is against the pressure of the fluid admitted by the pipe O² in front of the said piston. This arrangement is adopted for the purpose of securing a return of the piston to its normal position when the exhaust port of the main valve is open.

During the forward movement of the turret and its slide it is desirable that the turret should be prevented from turning or rotating, and to secure this result I employ a locking pin P² which, as shown in Figs. 5 and 17, is carried by the turret slide and adapted to engage successively the series of sockets and recesses Q² formed in the turret. This pin is held up in engagement with the turret by means of a coiled spring R², and is provided at its lower end with an inclined slot S², which when the turret slide comes back to its normal position preparatory to making a new cut, engages an inclined lug or projection T² secured upon the upper face of the cylinder, as shown in Figs. 5 and 17. As the lug or projection T² enters the groove S² it draws the pin P² down out of engagement with the turret, thus freeing said turret and permitting it to be turned by hand or by power as may be desired. As soon as the turret slide begins to move forward the lug or projection T² is withdrawn from the slot or groove S² and the spring R² throws the pin up into the socket Q² which is at that time directly over the pin; thereby preventing any further rotation of the turret relatively to its slide.

In order to provide for the constant rotation of the band-wheel P during the travel of the turret, I provide the arrangement of belting shown in Fig. 4. Upon reference to this figure it will be seen that at the opposite ends of the main frame are arranged band pulleys U² and V² about which and about the band-wheel P passes the driving band or belt W². The turret slide is provided with guide pulleys X², while the main frame of the machine is provided with a corresponding wheel or pulley Y² which serve to properly guide and support the band or belt as the turret-slide moves back and forth. From this arrangement it will be seen that the turret slide may move back and forth while the band W continues to rotate continuously.

The shaft U' carries at the back of the machine a large gear-wheel U³ which meshes with a smaller gear U⁴ (shown in Fig. 2) secured upon the shaft U⁵ to which the band-wheel U² is secured, hence it will be seen that the shaft U² will at all times have a slow rotary movement, sometimes with its disk T' and sometimes independently of the disk T' according to whether or not the disk is held against rotation by the engagement of the elbow lever A² with one of the teeth B².

The operation of the machine is as follows: Fluid under pressure is admitted to the rear end of the cylinder B, through pipe N³; the fluid of course passing around the main valve Q' and through the regulating valve E², on its way to the cylinder. This admission of fluid to the cylinder, acting through the piston C, causes the turret slide D with attendant parts to be carried forward toward the headstock of the machine. The shaft V³ (Fig. 4) being put in motion, causes, (through belt W² and gearing U², U⁵, U⁴ and U³) a slow rotation of the shaft U', the disk T' of which is held against rotation, by means of the elbow lever A². The band wheel P is also put in motion by the belt W², but as the shaft J is held against rotation by reason of the bar or shaft W engaging the stop X, (Figs. 15 and 16), the said wheel P will turn freely upon the sleeve T without imparting motion to the gearing that rotates the turret and the stop-bar. As the carriage or slide D moves forward as described, one of the cams F' on the stop-bar U, strikes the particular pin M' which had been previously set to correspond with the particular tool in the operating face of the turret, and depresses or rocks the block L' in which said pin is mounted. As the block is keyed to its shaft, this depression causes the shaft K' to turn or rock slightly, and in thus turning, to raise the free or outer end of its radial arm C² which is connected with the regulating valve E², and bring the valve to the partly-closed position indicated in Fig. 11; thereby reducing the speed of the turret slide automatically. It will be observed that there are as many pins M' as there are faces on the turret, and as these pins are independently adjustable, the block may be actuated or depressed to a greater or less extent as circumstances may require; or any one of the pins may be adjusted so low as not to be affected by the cam on the stop-bar, in which case no partial closing of the valve E² will take place. The same is true of the pins N' which, as the turret slide continues to advance, are struck by the supplemental cams G' of the stop-bar. When these pins N' are thus struck, the block to which they are secured is further depressed, and the shaft K' carrying the radial arm C² (connected to the valve E²) rocked so as to bring the valve to the closed position shown in Fig. 10. Just at the instant that this is accomplished, the stop or block H' on the stop-bar U, strikes the lug or stop O' of block L' (see Figs. 18 and 19) and moves the said block L' lengthwise of the shaft K' to which it is keyed; and as the block is thus moved it causes a longitudinal movement of the main-valve-shaft E'. This shaft E' being connected to the valve Q' through the elbow lever P', causes the said valve to be brought to the position shown in Fig. 14, that is, to a position where the fluid is neither admitted to nor allowed to escape from the cylinder, thereby causing the turret slide to remain momentarily at rest. As the elbow lever P' is rocked through the movement of rod E', the smaller elbow-lever X' will also be rocked as before explained, and its hook Z' thrown down out of engagement with the weighted elbow lever A² which latter, being in engagement with one of the teeth B², has held the disk T' against rotation. The release of the the lever A² by the lever X', also effects a release of the wheel or disk T', and allows the latter to turn with its shaft U'. In thus turning, one of its teeth or projections S' strikes against the arm Q³ of lever P' and moves said lever backward, bringing the main valve Q' to the position shown in Fig. 13; that is, with the inlet closed and the exhaust opened. The fluid now escapes from behind the piston C of the turret slide and the pressure of the fluid on the front end of the piston returns the slide toward its normal or starting point. As the slide D moves backward the incline T² engages the grooved pin P² and withdraws the latter from the turret, so that the turret may be turned upon its axis as now to be described.

It is to be observed that when the lever P' is rocked by the action of one of the teeth S' of the wheel T', the rod E' is also moved toward the head-stock of the machine; but in thus moving, its block D', striking against the lower end of the lever C', rocks the lever and moves the rod W lengthwise out of engagement with the stop X on the turret shaft J. The instant that the shaft J is released, the band-wheel P (which in the meantime has been rotating continuously) imparts motion to said shaft J as before described, and effects a rotation of the turret and the stop-bar U. As soon as the turret has been turned or rotated the required distance, one of the inclined cam faces B' of cam A', acting upon the roller Z of block Y, (Figs. 7, 15 and 16) moves the rod W lengthwise into engagement with the shaft J or the lug thereon, and prevents further rotation of the turret and stop-bar U. But as the rod W is thus moved lengthwise by the cam plate A' the lever C' is again rocked, and its lower end coming into engagement with the block D', moves the rod E' and the valve Q' to the position shown in Fig. 12. This movement of rod E' (and lever P') causes the levers X' and A² to assume their normal positions. The slide is now ready to be advanced for a new cut. If the teeth S' and B² of wheel T' are set close together as shown in Fig. 7, the lever P' will be rocked instantly upon the release of wheel T', but if these teeth be set quite a distance apart, the tooth S' will actuate the lever P' a considerable time after the lever A² is thrown out of engagement with the tooth B². Under the first of these arrangements, where the teeth S' and B² are set close together, there will be practically no dwell at the end of the travel of the turret slide; but under the second arrangement, where the teeth are set far apart, there is a considerable time or dwell during which the turret slide remains stationary. This is a feature of importance, as I am enabled to secure a dwell of any desired extent in the motion of the turret slide which is a matter of special value in facing.

By providing the stop-bar U with cams corresponding to the tools employed in different faces of the turret, and by providing a separate adjustable pin M' or N' for each face of the stop-bar, I secure a variety of adjustments not attainable in any other construction of which I am aware.

By the employment of fluid-pressure mechanism to actuate the turret, I dispense with the ordinary lead-screw heretofore used universally in this class of machines; and I am enabled to manufacture or cut screws of different pitch by merely varying the adjustment of the regulating valve, instead of substituting for one lead-screw, another of a different pitch as has heretofore been the practice.

While I have shown the piston as connected directly to the turret slide, this is not essential, any other form of connection serving to transmit motion from the piston to the slide, being within the scope of my invention.

Having thus described my invention, what I claim is:—

1. In a lathe, the combination with the main frame and a tool-post-carriage, one of said parts being provided with a cylinder and the other with a piston to act with the cylinder,— of a fluid-pressure mechanism for causing a travel of the tool-post carriage, relatively to the main frame.

2. In a lathe, the combination with a main frame, of a tool-post carriage provided with a piston, a cylinder to receive the piston, and means for controlling the admission of a fluid to and the exhaust from the cylinder.

3. In a lathe, the combination with a main frame, of a cylinder mounted lengthwise thereof, means for controlling the admission and exhaust of a fluid to and from the cylinder; a tool-post or turret carriage movable lengthwise upon the bed or frame and provided with a piston to work within the cylinder.

4. In a lathe, the combination with a main frame, of the turret slide mounted thereon, fluid-pressure mechanism for reciprocating the turret slide, and a main controlling valve actuated by the turret slide.

5. In a lathe, the combination with a main frame, of the turret slide mounted thereon, fluid pressure mechanism for reciprocating the slide, and a regulating valve actuated by the turret slide, whereby a variation in speed is secured.

6. In a lathe, the combination with a main frame, of the turret slide mounted thereon, fluid-pressure mechanism for reciprocating the turret slide, and a main controlling valve and a regulating valve both operated by the slide.

7. In a lathe, the combination with a main frame, of the turret slide provided with a turret, fluid pressure mechanism for reciprocating the turret slide, a stop bar journaled in the slide and geared to rotate with the turret, and valve mechanism actuated by the stop bar.

8. In combination with turret slide D, turret E provided with worm-wheel H; shaft J provided with worm I, and gear M; stud O; sleeve T provided with gear N; and a band wheel frictionally secured to the sleeve.

9. In combination with turret slide D and turret E, a shaft J for rotating the turret, provided with a stop X; a stop bar U geared to rotate with the turret; a rod W adapted to engage the stop X; and a cam plate A' rotating with the stop bar and adapted to actuate the rod W.

10. In combination with turret slide D a fluid pressure mechanism for actuating the same provided with a main valve and an operating rod as E'; a turret; a stop bar U geared with the turret; a rod W adapted to engage the turret-actuating shaft J; a cam A' mounted upon the stop bar to move the rod W in one direction; a lever C' connected to the rod; and a block D' mounted upon rod E' to rock the lever and thereby move rod W in the opposite direction.

11. In combination with a main frame a turret slide thereon, fluid pressure mechanism for actuating the latter, a main valve and its reciprocating rod E', the regulating valve and its rockshaft K', a block L' mounted upon shaft K' and connected with rod E', and a stop bar provided with cams to depress the block and rock the shaft, and to move the rod E' longitudinally.

12. In combination with a main frame, a turret slide thereon, fluid pressure mechanism for the latter, a main valve rod E', a rockshaft K' for the regulating valve, a block L' mounted upon the shaft K' so as to slide lengthwise and also to turn therewith, and connected to rod E', a stop bar provided with two sets of cams F' and G' to act successively to depress the block L' and rock the shaft K', and also with a cam or stop H' to engage the block and effect a reciprocation of the rod E'.

13. In combination with the shaft K', the block L' keyed thereto and provided with the pins M' and N', and a stop bar U provided with the cams F' and G' to engage the pins.

14. In a lathe, the combination of a main frame, a turret slide mounted thereon, fluid-pressure mechanism for reciprocating the slide, a regulating valve E² for the pressure mechanism, a block L' secured to the shaft of said valve a series of pins carried by the block, and a stop bar provided on its different faces with cams to engage the respective pins.

15. In a lathe, the combination of a main frame, a turret, and a turret slide mounted thereon, fluid-pressure mechanism for actuating the slide, a regulating valve $E^2$ provided with a rockshaft $K'$, a block $L'$ secured to the shaft and provided with pins $M'$ corresponding in number with the turret tools, and a stop bar geared to rotate with the turret and provided with cams to correspond to the pins $M'$.

16. In a lathe, the combination of a main frame, a turret slide mounted thereon, fluid pressure mechanism for actuating the slide, a main valve for said mechanism adapted to be actuated or moved in one direction by the turret slide, and means such as wheel $T'$ for also moving the valve, whereby a dwell is secured at the end of the travel of the turret slide.

17. In a lathe, the combination of a main frame, a turret slide mounted thereon, fluid pressure mechanism for actuating the slide, and controlling means substantially such as shown and described for causing a variation in the rate of travel of the slide.

18. In a lathe, the combination of a main frame, a turret slide mounted thereon, fluid pressure mechanism for actuating the slide and controlling means substantially such as shown and described for causing a dwell at the end of the travel of the slide.

19. In a lathe the combination with a main frame, of a turret slide mounted thereon, fluid pressure mechanism for actuating the slide, a main valve $Q'$ for said mechanism provided with a lever $P'$, a rotating shaft $U'$ provided with disk $T'$, teeth $S'$ and $B^2$ applied to said disk, and means for holding the disk against rotation, adapted to be released by the movement of the valve or its rod or lever.

20. In a lathe, the combination with a main frame, of a turret slide mounted thereon, fluid pressure mechanism for actuating the slide, main valve $Q'$, provided with rod $E'$ and lever $P'$, the elbow lever $A^2$ pivoted to the frame, the lever $X'$ pivoted to lever $P'$ and adapted to engage the lever $A^2$, a rotary shaft $U'$, a disk $T'$ mounted thereon and adapted to turn therewith when released, and teeth $S'$ and $B^2$ secured to the disk and adapted to engage, respectively, the levers $P'$ and $A^2$.

21. In a lathe, the combination with turret slide D and a fluid pressure mechanism for actuating the same, of a main valve $Q'$, provided with a rod $E'$, a turret, a stop-bar geared thereto, a rod W to engage the turret actuating shaft J, a cam $A'$ rotating with the stop-bar to actuate the rod W, a lever $C'$ connected with the rod, a block $D'$ secured to rod $E'$ to engage the lever $C'$, and means such as disk $T'$ for moving the rod, all substantially as shown and described.

22. In a lathe, the combination with a main frame, of a turret slide, a feed mechanism for the latter, a rotatable turret, gearing for rotating the turret, a continuously rotating band wheel P forming an element of the turret gearing, a stop mechanism which holds the turret-rotating-gearing out of action, and means for automatically withdrawing the stop at a predetermined point in the travel of the turret slide.

23. In a lathe, the combination with a main frame, of a turret slide and a rotatable turret, means for actuating the slide, gearing for rotating the turret, a stop which prevents the operation of such gearing, a locking pin $P^2$ for the turret and means substantially such as shown for withdrawing the pin and also the stop.

24. In combination with a turret slide and a fluid pressure mechanism therefor, a main controlling valve, and an interposed regulating valve, whereby a variation in the speed of the slide is attained.

In witness whereof I hereunto set my hand in the presence of two witnesses.

CONRAD M. CONRADSON.

Witnesses:
HARRY DEARDS,
W. R. BAGLEY.